Feb. 9, 1932. F. W. SMITH 1,844,265
SYRINGE
Filed Dec. 19, 1929
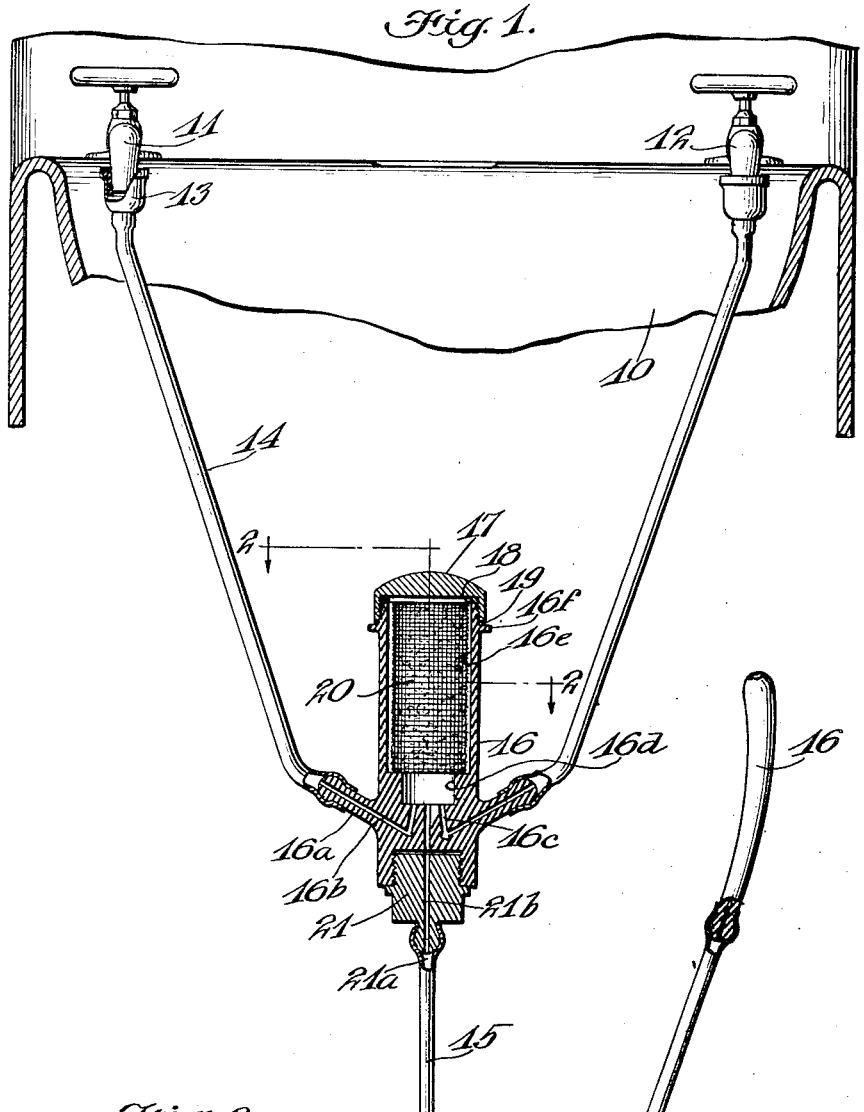
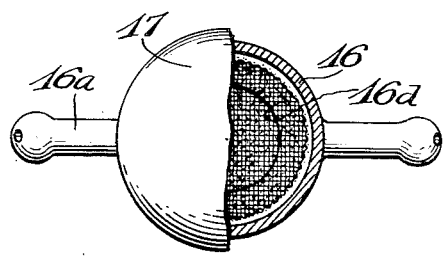
Inventor:
Frank W. Smith Patented Feb. 9, 1932

1,844,265

UNITED STATES PATENT OFFICE

FRANK W. SMITH, OF OAK PARK, ILLINOIS

SYRINGE

Application filed December 19, 1929. Serial No. 415,241.

My invention relates to syringes of the type used in homes and hospitals and my main object is to provide a device of this type which is adaptable either for use with the usual rubber bag or with a connection to the lavatory water supply.

A further object of the invention is to design the novel syringe with branch leads applicable to the hot and cold water faucets of the conventional lavatory, whereby to secure either hot or cold water or a mixture thereof at any desired temperature.

A still further object of the invention is to incorporate in the novel syringe a unit containing a medicated charge for absorption by the water stream passing through the syringe.

A final but nevertheless important object of the invention is to design the novel syringe with few and simple parts of a durable character.

With the above objects in view and any others that may suggest themselves from the specification and claim to follow, a better understanding of the invention may be had by reference to the accompanying drawings, in which—

Figure 1 is an elevation of the novel syringe, partly in section; and

Fig. 2 is a section on the line 2—2 of Figure 1.

My improvement deals chiefly with an apparatus leading water from the faucets of the lavatory to a single conduit for discharge. Thus, by specific reference to the drawings the lavatory is indicated at 10, the hot water faucet thereof at 11 and the cold water faucet at 12. The apparatus referred to originates with coupling caps 13 having rubber linings for frictional engagement with the faucets, the caps receiving rubber tubes 14 which extend in convergent relation to combine their contents for delivery into a single rubber tube 15 which terminates with a syringe nozzle 16.

In carrying out the invention, I interpose between the tubes 14 and 15 a mixing unit comprising a cylinder 16 of hard rubber or metal, extending this cylinder laterally with nipples 16a adapted to receive the corresponding ends of the tubes 14. The nipples are bored as indicated at 16b to lead the contents of the tubes to points near the center of the cylinder and the stock of the latter is further bored at 16c to divert such contents in convergent streams toward the axis of the cylinder. The bores 16c open upon a cylinder cavity 16d, which is enlarged to form a chamber 16e. One end of the cylinder opens into this chamber and is externally threaded to receive a closing cap 17, a washer 18 being provided inside the cap to seal the same with the end of the cylinder, and a washer 19 to seal the cap with a flange 16f projected peripherally of the cylinder.

Within the chamber 16e of the cylinder is adapted to be placed a cartridge 20 of medicated material, such as an antiseptic, astringent or sedative, the material being preferably porous or readily soluble when in contact with water. I have shown the material encased in a gauze wrapper for easy handling and maximum exposure.

The opposite end of the cylinder is tapped to receive a threaded plug 21 whose outer end is extended with a nipple 21a for the attachment of the tube 15. The plug is longitudinally bored as indicated at 21b and its bore is continued through the stock of the cylinder 16 to open into the cavity 16d.

In operation, it may be assumed that water from both of the faucets 11 and 12 is drawn for syringe use, since the use of either faucet alone would supply water at too extreme a temperature for comfort and safety. Water from both tubes 14 therefore enters the nipple 16a and passes through the bores 16b and 16c to discharge into the cavity 16d. Owing to the fact that the bores 16b and 16c are narrow, the pressure of the water is increased so that the streams issuing from the convergent bores 16c have the force of jets and strike the medicated cartridge with the effect of loosening its bottom into solution. This solution escapes by way of the central bore 21b and then enters the tube 15 for discharge by the nozzle 16. The tube 15 is also of a narrow gauge so that the force of the water is retained, causing the nozzle 16 to emit the solution in the form of a powerful spray. Thus, the user is able to regulate the temperature and amounts of the water streams by controlling the faucets 11 and 12 as desired, the benefit of the medicinal solution being derived at the same time.

When a cartridge has had so much use that it becomes totally dissolved or nearly so, it is an easy matter to remove it and replace it by a fresh one, no other attention being required than to open and replace the cap 17.

In case it is desired to make use of the conventional rubber bag occasionally, it is an easy matter to unscrew the plug 21 from the mixing cylinder and apply the same to the bottom of the rubber bag.

It will be seen that I have provided a simple apparatus for improving the use of the syringe, first, by the employment of the constant and continuous water supply afforded by the lavatory faucets; second, regulating the faucets to control the temperature and volume of the water streams; and third, interposing the medicated unit at the mixing zone to render the water stream beneficial in a medicinal sense.

While I have illustrated and described the invention in the preferred embodiment, it will be evident that the same is capable of minor changes and refinements and it is my intention to claim such changes and refinements as coming within the spirit and scope of the appended claim.

I claim:—

A syringe adapted to be connected to the hot and cold water leads of a lavatory, comprising a vessel adapted to receive a medicinal filler, a top closure for the vessel, bottom discharge means, nipples for the leads and bottom discharge means, said nipples being bored to lead close to the center of the vessel, and the bores being continued in convergent relation toward the vessel cavity and below the medicinal filler whereby to cause their flows to meet in the region of said filler.

In testimony whereof I affix my signature.

FRANK W. SMITH.